United States Patent
Hiramatsu et al.

(10) Patent No.: US 11,532,161 B2
(45) Date of Patent: *Dec. 20, 2022

(54) PORTABLE COMPUTING DEVICE INSTALLED IN OR MOUNTABLE TO A SHOPPING CART

(71) Applicant: TOSHIBA TEC KABUSHIKI KAISHA, Tokyo (JP)

(72) Inventors: Kenya Hiramatsu, Kita Tokyo (JP); Akiko Susaki, Ota Tokyo (JP); Tsuyoshi Gotanda, Ota Tokyo (JP); Takashi Nakajima, Ota Tokyo (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 20 days.

This patent is subject to a terminal disclaimer.

(21) Appl. No.: 16/831,742

(22) Filed: Mar. 26, 2020

(65) Prior Publication Data

US 2020/0226389 A1 Jul. 16, 2020

Related U.S. Application Data

(63) Continuation of application No. 15/910,731, filed on Mar. 2, 2018, now Pat. No. 10,621,441.

(30) Foreign Application Priority Data

Mar. 6, 2017 (JP) .............................. JP2017-041920

(51) Int. Cl.
*G06V 20/52* (2022.01)
*G06K 7/10* (2006.01)
(Continued)

(52) U.S. Cl.
CPC ......... *G06V 20/52* (2022.01); *G06K 7/10366* (2013.01); *G06Q 30/0601* (2013.01);
(Continued)

(58) Field of Classification Search
CPC ................ G07G 1/0081; G07G 1/0045; B62B 2203/50; B62B 5/0096; G06Q 20/208
See application file for complete search history.

(56) References Cited

U.S. PATENT DOCUMENTS 8,517,266 B2 8/2013 Yamada et al.
10,121,133 B2 11/2018 Nelms et al.
(Continued)

FOREIGN PATENT DOCUMENTS

CN 204576602 U 8/2015
JP H07-168981 A 7/1995
(Continued)

OTHER PUBLICATIONS

Extended European Search Report dated May 16, 2018, filed in counterpart European Patent Application No. 18154745.6 (8 pages).
(Continued)

*Primary Examiner* — Ross Varndell
(74) *Attorney, Agent, or Firm* — Kim & Stewart LLP

(57) ABSTRACT

A computing device installed in or mountable to a shopping cart, includes a camera configured to capture an image, and a processor configured to acquire commodity data of a registered commodity, when an object is placed in the shopping cart, perform object recognition on an image of the object captured by the camera, and determine whether the recognized object is a commodity corresponding to the acquired commodity data, and upon determining that the recognized object is not the commodity corresponding to the acquired commodity data, issue a request for displaying a message instructing registration of the recognized object as a registered commodity.

21 Claims, 9 Drawing Sheets

(51) Int. Cl.
*H04N 7/18* (2006.01)
*G06Q 30/06* (2012.01)
*G07G 1/00* (2006.01)
*G07G 1/14* (2006.01)

(52) U.S. Cl.
CPC ......... *G07G 1/0045* (2013.01); *G07G 1/0072* (2013.01); *G07G 1/0081* (2013.01); *G07G 1/14* (2013.01); *H04N 7/183* (2013.01)

(56) References Cited

U.S. PATENT DOCUMENTS

| | | | |
|---|---|---|---|
| 2012/0227103 A1* | 9/2012 | Itagaki | G06F 21/31 726/16 |
| 2012/0284132 A1* | 11/2012 | Kim | G07G 1/0081 705/20 |
| 2012/0296751 A1 | 11/2012 | Napper | |
| 2015/0019391 A1 | 1/2015 | Kumar et al. | |
| 2016/0086149 A1 | 3/2016 | Yuyama | |
| 2017/0186010 A1* | 6/2017 | Gotanda | G06Q 20/4037 |

FOREIGN PATENT DOCUMENTS

| | | |
|---|---|---|
| JP | 2001-034850 A | 2/2001 |
| JP | 2003-331024 A | 11/2003 |
| JP | 2008-146427 A | 6/2008 |
| JP | 2010-182105 A | 8/2010 |
| JP | 2010-280468 A | 12/2010 |
| JP | 2011-076351 A | 4/2011 |
| JP | 2011-203058 A | 10/2011 |
| JP | 2011-227771 A | 11/2011 |
| JP | 2013-222222 A | 10/2013 |
| JP | 2013-541107 A | 11/2013 |
| JP | 2014-032697 A | 2/2014 |
| JP | 2014-71599 A | 4/2014 |
| JP | 2015-106380 A | 6/2015 |
| JP | 2016-062545 A | 4/2016 |
| WO | 2011/088568 A1 | 7/2011 |

OTHER PUBLICATIONS

Notice of Reasons for Refusal dated Dec. 24, 2019 in corresponding Japanese Patent Application No. 2019-154022 with machine English translation, 8 pages.
Office Action dated Aug. 11, 2020, filed in counterpart Japanese Patent Application No. 2017-041920, 7 pages (with translation).
Notice of Reasons for Refusal dated Aug. 3, 2021 in corresponding Japanese Patent Application No. 2020-120575, 4 pages (with Translation).
Office Action dated Sep. 28, 2021 in corresponding Chinese Patent Application No. 201810068349.7, 28 pages (with Translation).
Notice of Reasons for Refusal dated Apr. 5, 2022 in corresponding Japanese Patent Application No. 2021-136521, 3 pages (with Translation).
Notice of Reasons for Refusal dated Aug. 30, 2022 in corresponding Japanese Patent Application No. 2021-136521, 10 pages (with Translation).

* cited by examiner

FIG. 8

| | REGISTERED COMMODITY | SKIP FLAG | DETECTION OBJECT | CHECK RESULT |
|---|---|---|---|---|
| D1 { | COMMODITY A | | OBJECT A | OK |
| | COMMODITY B | | OBJECT B | OK |
| D2 → | COMMODITY C | 1 | — | OK |
| D3 → | COMMODITY D | | — | NG |
| D4 { | — | | OBJECT E | NG |
| | — | | OBJECT F | NG |
| | ⋮ | | ⋮ | ⋮ |

FIG. 9A

PLEASE INPUT REGISTERED COMMODITY IN CART.

FIG. 9B

UNREGISTERED COMMODITY IS IN CART.
PLEASE REGISTER COMMODITY.

FIG. 9C

COMMODITY HAS BEEN TAKEN OUT FROM CART.
PLEASE PERFORM RETURN OPERATION WHEN
COMMODITY IS RETURNED.

PORTABLE COMPUTING DEVICE INSTALLED IN OR MOUNTABLE TO A SHOPPING CART

CROSS-REFERENCE TO RELATED APPLICATION

This application is a continuation of U.S. patent application Ser. No. 15/910,731, filed Mar. 2, 2018, which is based upon and claims the benefit of priority from Japanese Patent Application No. 2017-041920, filed Mar. 6, 2017, the entire contents of which are incorporated herein by reference.

FIELD

Embodiments described herein relate generally to a portable computing device installed in or mountable to a shopping cart.

BACKGROUND

In retail stores such as supermarkets, checkout systems allowing customers to perform payment processing have been introduced to achieve efficiency at the point of sale (POS). For example, self-service checkout systems including self-service checkout terminals have been introduced. In the self-service checkout systems, commodities are registered by reading commodity codes (generally, barcodes) through customer operations, payment information of the registered commodities is generated, and then processing of the payment for the registered commodities is performed.

Further, in recent years, personal checkout systems in which commodity registration is performed on commodities planned to be purchased while customers are shopping, have been considered. In such systems, commodities inserted in carts or baskets are identified as commodities planned to be purchased.

DESCRIPTION OF THE DRAWINGS

FIG. 8 is a diagram illustrating a commodity checklist according to the embodiment.

FIG. 9A is a diagram illustrating an example of a message according to the embodiment.

FIG. 9B is a diagram illustrating an example of another message according to the embodiment.

FIG. 9C is a diagram illustrating an example of another message according to the embodiment.

DETAILED DESCRIPTION

Embodiments provide a portable computing device installed in or mountable to a shopping cart that is linked with a hand-held commodity registration apparatus to reliably register commodities to be purchased through customer operation.

According to an embodiment, a computing device installed in or mountable to a shopping cart, includes a camera configured to capture an image, and a processor configured to acquire commodity data of a registered commodity, when an object is placed in the shopping cart, perform object recognition on an image of the object captured by the camera, and determine whether the recognized object is a commodity corresponding to the acquired commodity data, and upon determining that the recognized object is not the commodity corresponding to the acquired commodity data, issue a request for displaying a message instructing registration of the recognized object as a registered commodity.

Hereinafter, the embodiment will be described with reference to the drawings.

Figure 1:
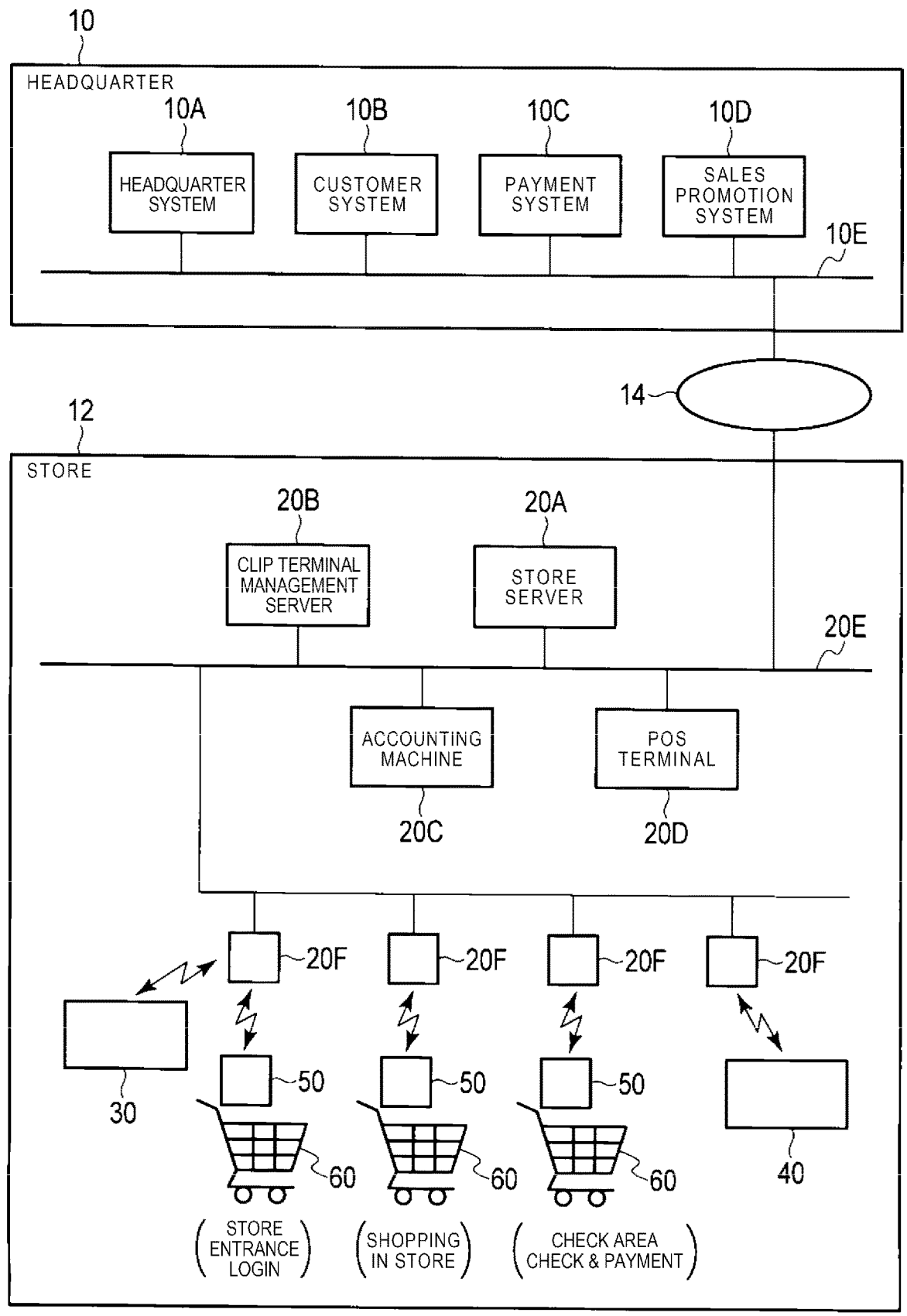
FIG. 1 is a system configuration diagram schematically illustrating an overall configuration of a system according to an embodiment.

FIG. 1 is a system configuration diagram schematically illustrating an overall configuration of a system according to an embodiment. In the system illustrated in FIG. 1, a system 10 installed in a headquarter and a store system 12 installed in each of a plurality of stores are connected via a network 14 including a dedicated line or the Internet.

In the system 10 installed in the headquarter, for example, a headquarter system 10A, a customer system 10B, a payment system 10C, a sales promotion system 10D, and the like are connected to each other via a network 10E such as a local area network (LAN).

The headquarter system 10A performs a process of controlling the store system installed in each store. The customer system 10B manages customers who purchase commodities using the store system. The payment system 10C performs a process (individual authentication, credit payment, or the like) for payment using a credit card or the like by a customer in the store system. The sales promotion system 10D performs management through the store system to provide customers (in particular, electronic apparatuses used by customers) with information regarding commodity advertisement for sales promotion, a store guide, or the like.

An example of the store system 12 in a store may be a point of sales (POS) system. In the store system 12, for example, a store server 20A, a clip terminal management server 20B, a plurality of accounting machines 20C, a plurality of POS terminals 20D, and the like are installed and connected to each other via a network 20E such as a LAN.

The store server 20A controls the store system 12. The store server 20A stores data regarding commodities sold in the store, for example, data such as a commodity code of each commodity, a commodity name, a unit price, a weight, a commodity position sold in the store (e.g., the position of a commodity shelf), and a commodity image. In commodity registration, data of a commodity corresponding to a commodity code read by scanning the commodity can be received from the store server 20A and payment information (including an amount of money, a commodity, and a number) can be generated. The clip terminal management server 20B manages an electronic apparatus (e.g., a clip terminal 50 to be described below). The clip terminal 50 is used to check whether commodities registered using an electronic apparatus 30 as commodities planned to be purchased are identical to commodities inserted in the cart 60 or a basket as commodities planned to be purchased. The accounting machine 20C performs payment processing on a commodity registered using the electronic apparatus 30 through a customer operation. The POS terminal 20D performs registration of a commodity of a customer through a salesclerk operation and payment processing on the registered commodity.

A plurality of access points (e.g., base stations) 20F are connected to the network 20E wired in the store. The access point 20F performs wireless communication with various electronic apparatuses used in the store via, for example, a wireless LAN. The electronic apparatuses used in the store includes, for example, the electronic apparatus 30 used by the customer, an electronic apparatus 40 used by a salesclerk, and the clip terminal 50 mounted on the cart 60.

For example, a smartphone and a tablet personal computer (PC) are used as the electronic apparatuses 30 and 40. The electronic apparatus 30 cooperates with the clip terminal 50 to perform registration of commodities planned to be purchased based on an application program (including a check program) for using services provided by the store system. 12 and presence checking performed to check whether the commodities registered through commodity registration are identical to commodities inserted in the cart 60 or the basket as commodities planned to be purchased. The electronic apparatus 40 performs confirming so that a salesclerk (attendant) can easily confirm whether commodity information registered is identical to the commodities inserted in the cart 60 based on a confirmation program for confirming the commodity registration performed by the electronic apparatus 30.

The electronic apparatus 30 and the clip terminal 50 may communicate via the clip terminal management server 20B (via the network 20E) or may communicate directly through short-range wireless communication. Further, the electronic apparatuses may be connected via a communication cable to perform wired communication.

Figure 2:
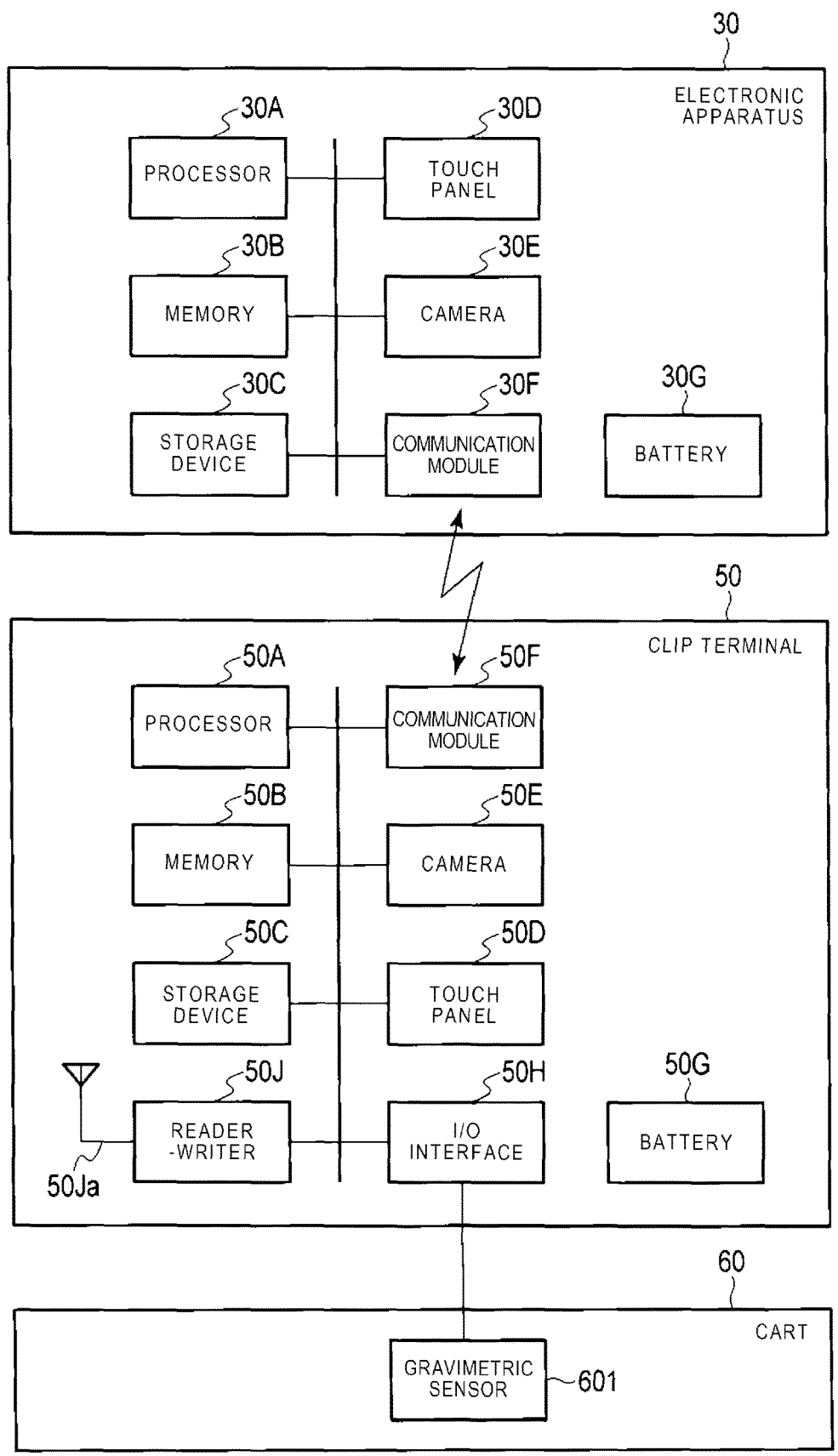
FIG. 2 is a block diagram illustrating configurations of electronic apparatuses according to the embodiment.

FIG. 2 is a block diagram illustrating configurations of the electronic apparatus 30 and the clip terminal 50 according to the embodiment. The description will be made of a smartphone as an example of the electronic apparatus 30. The clip terminal 50 is assumed to be configured as a dedicated clip terminal 50 that executes presence checking in the store system 12. Hereinafter, the clip terminal 50 will be described. The clip terminal 50 can also be realized by installing the check program on a dedicated apparatus (e.g., a computer) such as a smartphone on which a camera is mounted.

The electronic apparatus 30 includes a processor 30A, a memory 30B, a storage device 30C, a touch panel 30D, a camera 30E, a communication module 30F, and a battery 30G.

The processor 30A is a circuit that controls each unit by executing a program recorded on the memory 30B to carry out various processes of the electronic apparatus 30.

The memory 30B records data to be used for the processor 30A to execute various processes in addition to programs to be executed by the processor 30A. The programs recorded on the memory 30B include a commodity registration program executing registration of commodities planned to be purchased and a check program executing presence checking performed to check whether commodities registered through the commodity registration are identical to commodities inserted in the cart 60 or a basket as commodities planned to be purchased. The data stored in the memory 30B includes payment information generated based on a commodity code read during the commodity registration and commodity information regarding a commodity registered through the commodity registration.

The storage device 30C may be a hard disk drive (HDD) device, a solid-state drive (SSD) device, or the like. The storage device 30C records data to be used for the processor 30A to perform various processes or data generated by a process of the processor 30A.

The touch panel 30D is a device on which an input operation is performed by a customer and includes a display device and a touch sensor. Any screen such as a graphical user interface (GUI) screen associated with a process of the processor 30A is displayed on the touch panel 30D.

The camera 30E captures an image under the control of the processor 30A.

The communication module 30F is, for example, a wireless communication interface, and controls communication with an external electronic apparatus under the control of the processor 30A. The communication module 30F can control communication such as wireless communication with the access point 20F and short-range wireless communication with another electronic apparatus such as the clip terminal 50.

The clip terminal 50 includes a processor 50A, a memory 50B, a storage device 50C, a touch panel 50D, a camera 50E, a communication module 50F, a battery 50G, an I/O interface 50H, and a reader-writer 50J.

The processor 50A is a circuit that controls each unit by executing a program recorded on the memory 50B to realize various processes of the clip terminal 50.

The memory 50B records data to be used for the processor 50A to perform various processes in addition to programs to be executed by the processor 50A. The programs recorded on the memory 50B include a check program for executing presence checking performed to check whether commodities registered through the registration are identical to commodities inserted in the cart 60 or a basket as commodities planned to be purchased. The check program includes an image processing program which is executed to perform image processing to identify a commodity from an image captured by the camera 50E and detect that the identified commodity is inserted in the cart 60 or taken out from the cart 60. The data stored in the memory 50B includes various kinds of data such as commodity information registered through commodity registration using the electronic apparatus 30, object management data (see FIG. 11) for managing an object detected through image processing, and a commodity checklist (see FIG. 8) for checking commodities inserted in the cart 60 are stored.

The storage device 50C may be a hard disk drive (HDD) device, a solid-state drive (SSD) device, or the like. The storage device 50C records data to be used for the processor 50A to perform various processes or data generated by a process of the processor 50A.

The touch panel 50D is a device on which an input operation is performed by a customer and includes a display device and a touch sensor. Any screen such as a graphical user interface (GUI) screen associated with a process of the processor 50A is displayed on the touch panel 50D.

The camera 50E captures an image under the control of the processor 50A.

The communication module 50F controls communication with an external electronic apparatus under the control of the processor 50A. The communication module 50F can control communication such as wireless communication with the access point 20F and short-range wireless communication with another electronic apparatus such as the electronic apparatus 30.

The I/O interface 50H is an interface for inputting a signal from an external apparatus and is, for example, a gravimetric sensor 601 (e.g., a scale, a pressure sensitive instrument, a gravimeter, or the like) mounted on a basket bottom 600 of the cart 60. The gravimetric sensor 601 detects the weight of a commodity inserted (put) in the cart 60 and outputs a detection signal.

The reader-writer 50J communicates with a radio frequency (RF) tag mounted on each commodity to be sold in the store or a commodity shelf or the like in the store. A communication range by the reader-writer 50J is for example, a communicable range with an RF tag of a commodity inserted in the cart 60 or a communicable range with an RF tag mounted on a commodity shelf when the cart 60 is moved in the store. The reader-writer 50J can be used to detect that a commodity is inserted in or take output from the cart 60 or can be used to determine a location of the cart 60 on which the clip terminal 50 is mounted, in the store.

Figure 3:
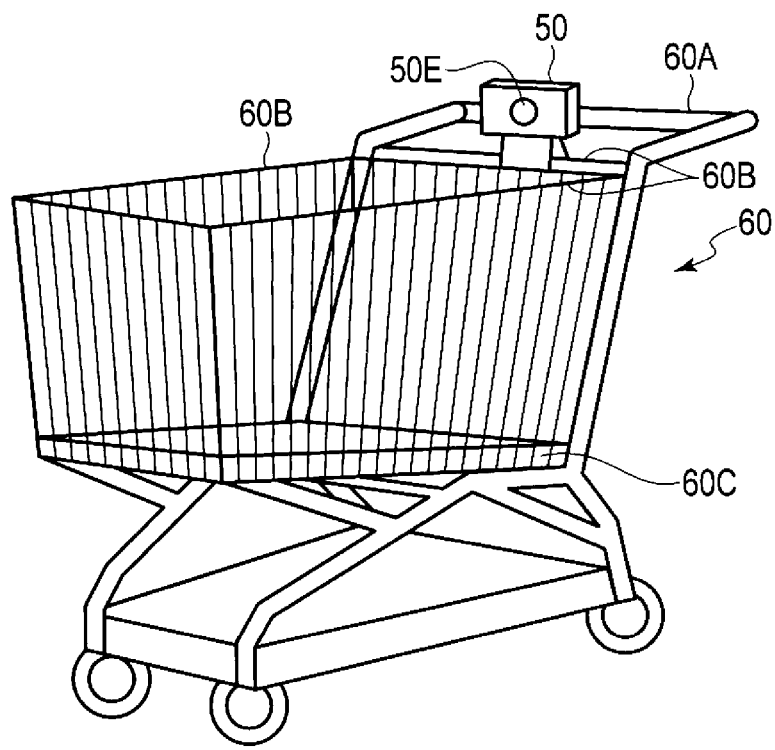
FIG. 3 is a diagram illustrating an example of a clip terminal mounted onto a cart according to the embodiment.
Figure 4:
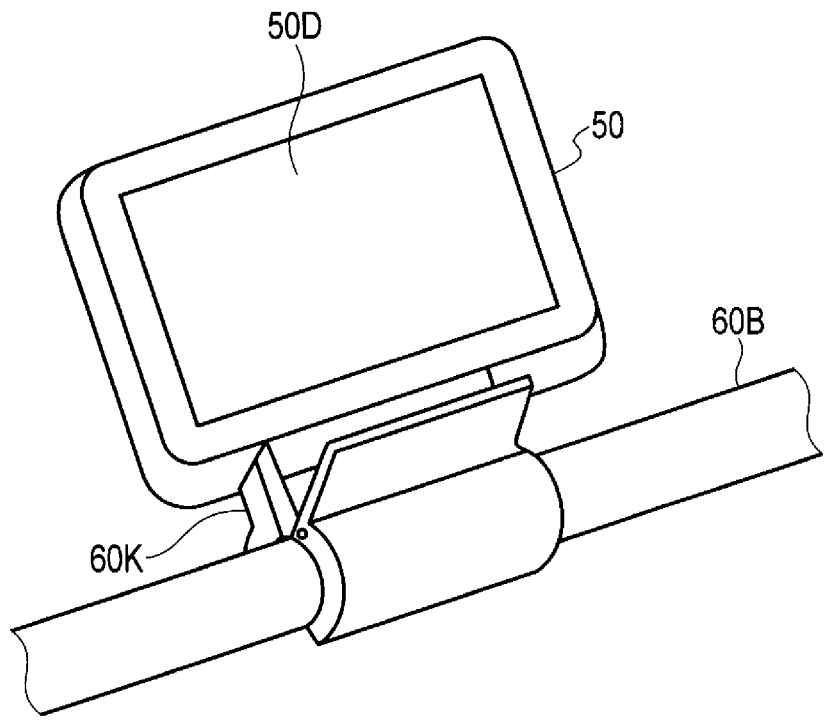
FIG. 4 is a diagram illustrating an exterior of the clip terminal according to the embodiment.

FIG. 3 is a diagram illustrating an example of the clip terminal 50 mounted onto the cart 60 according to the embodiment. FIG. 4 is a diagram illustrating an exterior of the clip terminal 50 according to the embodiment.

For example, the clip terminal 50 is mounted on an upper frame 60B of the cart 60 used in the store. As illustrated in FIG. 4, a clip 60k is installed in the clip terminal 50 so that mounting can be performed therewith. Accordingly, it is not necessary to mount the clip terminal 50 on all of the carts 60 in advance in the store. The clip terminal 50 may be mounted only when the cart 60 is for a customer using a service of presence checking. Therefore, large-scale investment such as remodeling of the store or exchange of the carts 60 is not necessary in order to implement the presence checking service. Therefore, this service can be provided at a low cost.

The example illustrated in FIG. 3 is an example in which the clip terminal 50 is mounted on an upper frame 60B near a handle 60A of the cart 60. When the clip terminal 50 is mounted, the camera 50E provided in the clip terminal 50 faces a basket bottom 60C and an imaging range of the camera 50E is adjusted so that at least all of the commodities inserted in the cart can be imaged. The imaging range of the camera 50E preferably contains the upper frame 60B so that areas outside and inside the basket can be clearly distinguished in an image captured by the camera 50E. Further, the imaging range of the camera 50E is preferably set such that a motion of for example, an arm (hand) of a customer can be imaged to detect a customer operation of inserting and taking out a commodity.

As illustrated in FIG. 4, the clip terminal 50 is mounted on the upper frame 60B so that a display surface of the touch panel 50D faces a customer. Thus, it is easy to confirm information (e.g., a message or the like) indicating an image captured by the camera 50E or a check result of the presence checking performed using the captured image.

Figure 5:
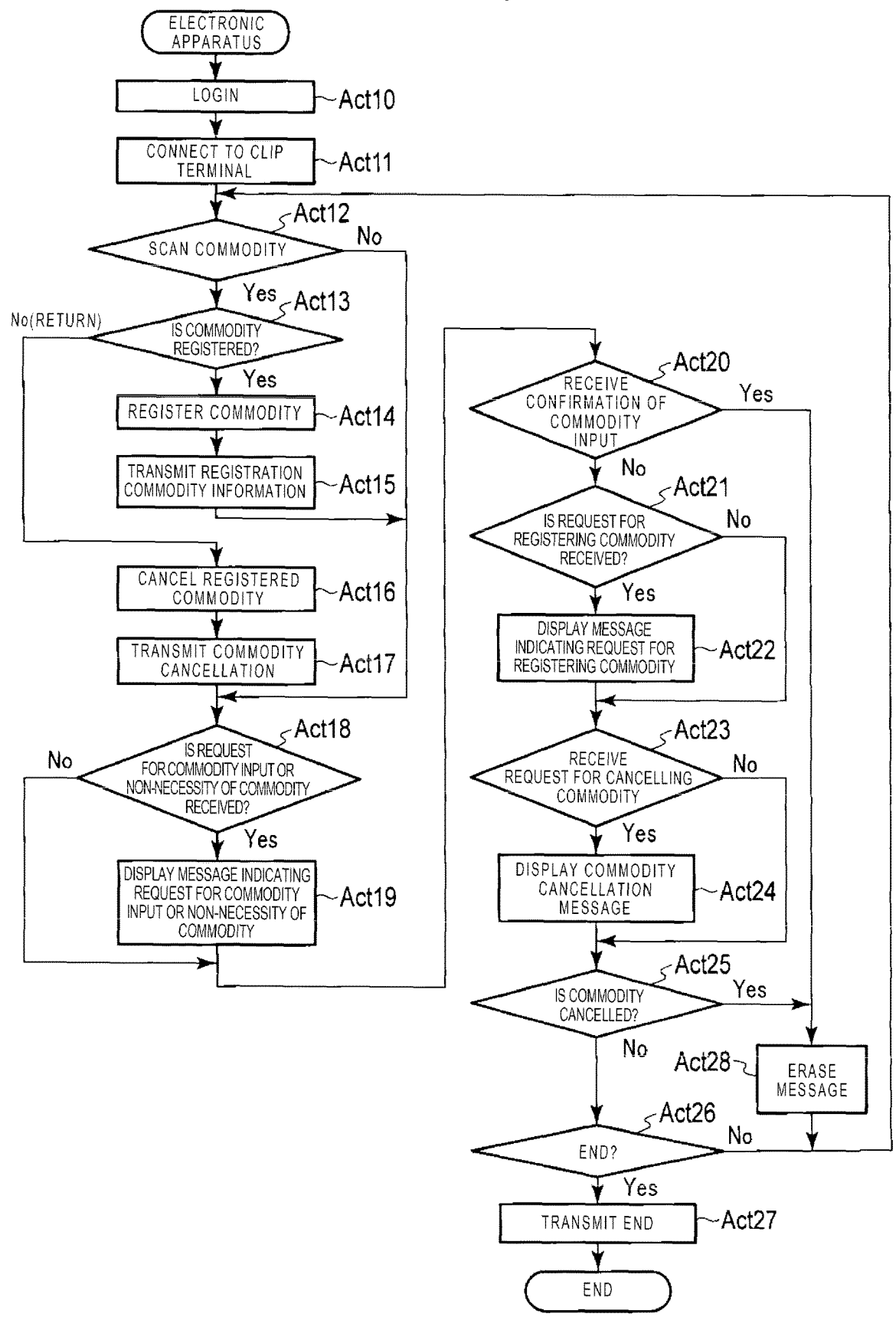
FIG. 5 is a flowchart illustrating an operation of the electronic apparatus according to the embodiment.
Figure 6:
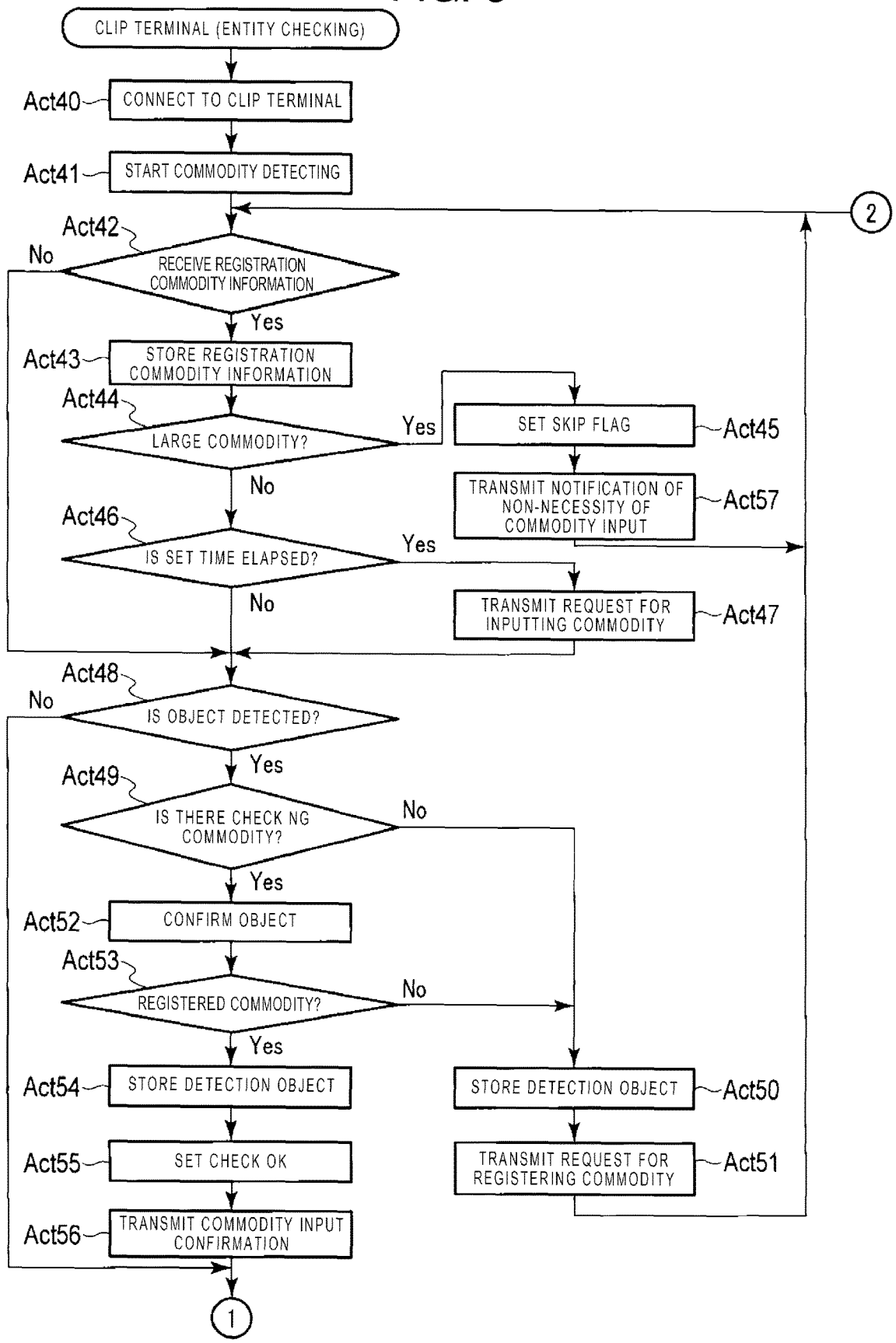
FIG. 6 is a flowchart illustrating an operation of the clip terminal according to the embodiment.
Figure 7:
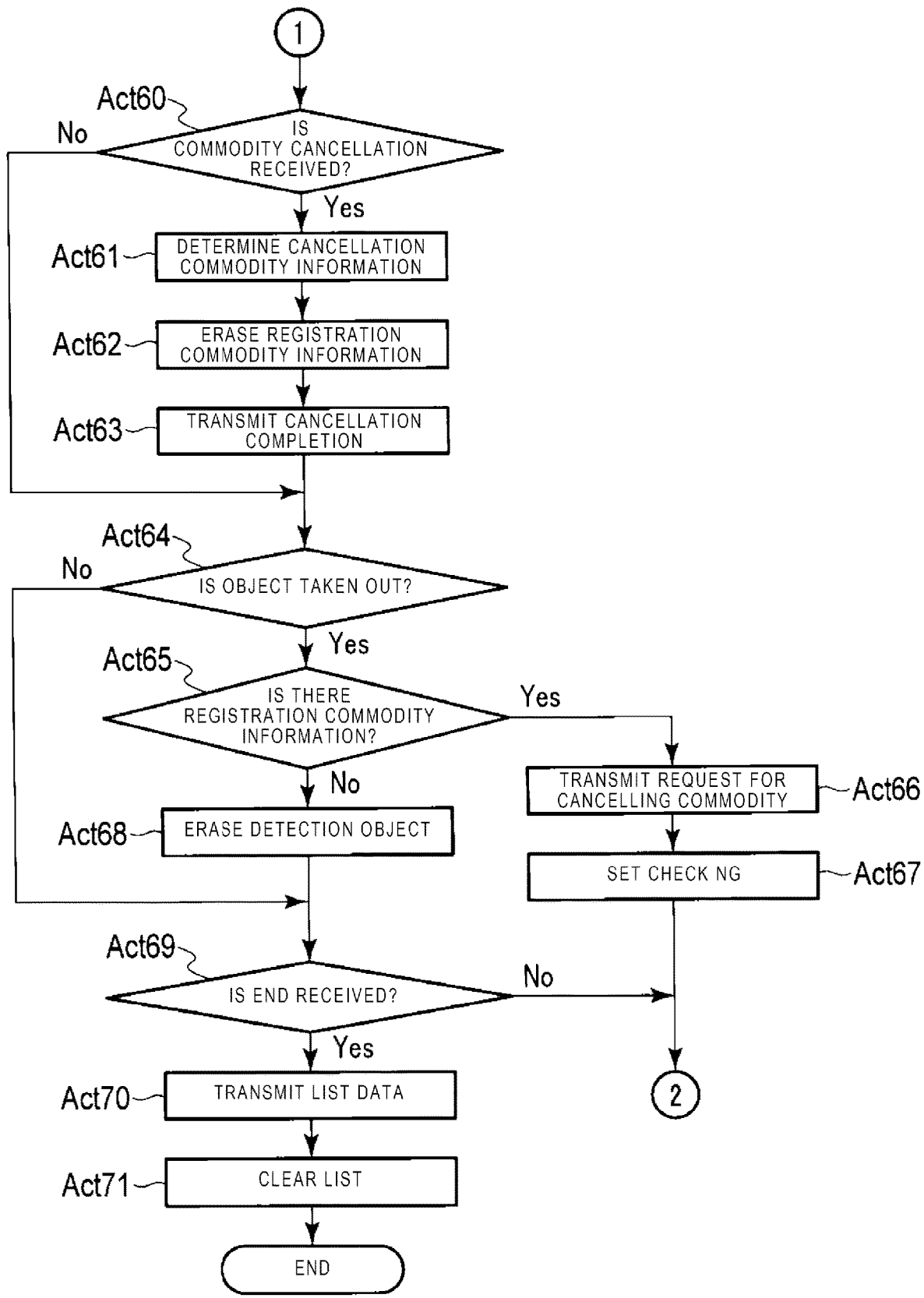
FIG. 7 is a flowchart illustrating the operation of the clip terminal according to the embodiment.

Next, operations of the electronic apparatus 30 and the clip terminal 50 used in the store system 12 according to the embodiment will be described. FIG. 5 is a flowchart illustrating an operation of the electronic apparatus 30 according to the embodiment. FIGS. 6 and 7 are flowcharts illustrating an operation of the clip terminal 50 according to the embodiment.

When a customer performs commodity registration using the electronic apparatus 30, an application program for using services provided by the store system 12 is activated. Hereinafter, the processor 30A of the electronic apparatus 30 executes the application program to perform commodity registration and presence checking.

First, the electronic apparatus 30 performs login for connection to the store system 12 (Act10). In the login process, for example, a barcode containing a membership code unique to a member and attached to a membership card is read by the camera 30E. The processor 30A extracts the membership code from the barcode read by the camera 30E and transmits the membership code to the clip terminal management server 20B. The clip terminal management server 20B performs member authentication by comparing with membership data managed by the customer system 10B based on the membership code received from the electronic apparatus 30.

When the electronic apparatus 30 is notified that the member authentication is successful by the clip terminal management server 20B, the electronic apparatus 30 displays a selection screen of services available in the store. The services available in the store include display of leaflet information, guide display of special commodities, display of a store guide (map), and use of the clip terminal 50, in addition to commodity registration for purchase planning. When using the clip terminal 50, a message is output from the clip terminal 50 in situations where commodity registration is not performed on, for example, a commodity inserted in the cart 60. Accordingly, a customer can be prevented from forgetting to register a commodity planned to be purchased. While a customer is shopping in the store, a commodity planned to be purchased is checked by the clip terminal 50. Therefore, it is possible to reduce a burden on an attendant performing confirmation of registered commodities after commodity registration by the customer ends.

When a customer uses the clip terminal 50, the store system 12 may prompt the customer to use the clip terminal 50 by providing a benefit (e.g., reward points or the like) to the customer. The data indicating the benefit for the customer is stored in the customer system 10B.

When the clip terminal 50 is used, the electronic apparatus 30 and the clip terminal 50 communicate with each other. For example, the clip terminal 50 is mounted on the cart 60 used by a customer (or the customer is allowed to use the cart 60 on which the clip terminal 50 is mounted in advance), and a link between the electronic apparatus 30 of the customer and the clip terminal 50 is established. For example, the electronic apparatus 30 and the clip terminal 50 are paired to be able to communicate with each other through short-range wireless communication. Alternatively, a unique code of the clip terminal 50 is read by the electronic apparatus 30 and is transmitted from the electronic apparatus 30 to the clip terminal management server 20B. The clip terminal management server 20B determines the electronic apparatus 30 and the clip terminal 50 that are paired to perform the presence checking, and enables the electronic apparatus 30 and the clip terminal 50 that are paired, to communicate via the clip terminal management server 20B (the network 20E). Another method can be used as the method of connecting the electronic apparatus 30 to the clip terminal 50.

When connection to the clip terminal 50 is made (Act11), the processor 30A of the electronic apparatus 30 causes commodity registration to be executable. The processor 50A of the clip terminal 50 is connected to the electronic apparatus (Act40) and starts commodity detection. Commodity detection is a process of detecting objects corresponding to commodities from an image captured by the camera 50E. The processor 50A detects the objects corresponding to the commodities from the image captured by the camera 50E through known image processing techniques and stores the position of each object. When the processor 50A detects that an object has moved from outside the cart to inside the cart or from inside the cart to outside the cart, the processor 50A determines that the customer performs an operation of inserting or taking out a commodity. Based on the change in the object location before and after this operation, the processor 50A detects that a commodity has been inserted or taken out. Even when the processor 50A detects an operation by the customer and the number of objects in the cart has not changed, the processor 50A determines that, for example, the customer puts a commodity in the cart again. The processor 50A stores the position of the object which has been put in the cart again. The processor 50A stores the object detected from the image captured by the camera 50E in a commodity checklist.

FIG. 8 is a diagram illustrating an example of a commodity checklist according to the embodiment. As illustrated in FIG. 8, in the commodity checklist, data of objects detected from an image captured by the camera 50E, data of information regarding commodities that have been registered in the electronic apparatus 30, and data (for example, D1 to D4) associated with data (check result "OK" or "NG") indicating a result obtained by checking whether the registered commodities are identical to the commodities corresponding to the detected objects, are stored.

The customer registers a commodity by using the camera 30E of the electronic apparatus 30 to scan a barcode attached to the commodity which the customer purchases while shopping in the store (Act12). The processor 30A detects the barcode from the image captured by the camera 30E and extracts a commodity code from the barcode. The processor 30A acquires information regarding the commodity corresponding to the commodity code from the store server 20A through, for example, the clip terminal management server 20B (the network 20E) and displays the information on the touch panel 30D. That is, a commodity name, a price, a commodity image, and the like of the commodity read through the commodity scanning are displayed so that the customer can confirm the commodity name, the price, the commodity image, and the like of the commodity. Here, when the customer performs an operation of instructing commodity registration (for example, touches a button of the commodity registration displayed on the touch panel 30D) (Yes in Act13), the processor 30A stores the commodity read through the commodity scanning as a registered commodity planned to be purchased (Act14). The processor 30A transmits the information regarding the registered commodity to the clip terminal 50 (Act15).

When the clip terminal 50 receives the information regarding the registered commodity from the electronic apparatus 30 (Yes in Act42), the clip terminal 50 stores the information regarding the registered commodity in the commodity checklist (Act43). When an oversized commodity is detected with reference to the information regarding the registered commodity, that is, it is determined that it is not necessary to insert the commodity in the cart 60 (e.g., the commodity is too large to be insertable), the processor 50A sets a skip flag in the commodity checklist (Act45). In the example illustrated in FIG. 8, the skip flag is set as the data D2 in association with a registered commodity "commodity C". The processor 50A excludes the registered commodity "commodity C" for which the skip flag is set as a checking target. The processor 50A transmits notification of non-necessity of a commodity insertion into the cart, to the electronic apparatus 30 (Act57).

When the notification of the non-necessity of the commodity insertion is received from the clip terminal 50 (Yes in Act18), the processor 30A of the electronic apparatus 30 displays a message for notifying the customer that it is not necessary to insert the commodity in the cart 60 on the touch panel 30D together with the information (the commodity name, the commodity image, the price, and the like) regarding the registered commodity. The message of the non-necessity of the commodity insertion may not only be displayed on the electronic apparatus 30 but may also be displayed on the touch panel 50D of the clip terminal 50.

Conversely, when the registered commodity is not an oversized commodity, the processor 50A acquires, for example, commodity dictionary data for identifying the registered commodity through image processing, from the clip terminal management server 20B through the network 20E. The commodity dictionary data correlates objects to its features so that the commodity can be recognized from its features such as a barcode attached to the commodity, a design of a package, or letters, that are detected from the image of the commodity. For example, when the commodity dictionary data corresponding to the registered commodity is not stored in the clip terminal 50, the processor 50A outputs a request for transmitting the commodity dictionary data corresponding to the registered commodity to the clip terminal management server 20B. The clip terminal management server 20B transmits the commodity dictionary data of the corresponding commodity to the clip terminal 50 in response to the transmission request from the clip terminal 50. When the electronic apparatus 30 and the clip terminal 50 communicate through the clip terminal management server 20B and the clip terminal management server 20B receives the information regarding the registered commodity from the electronic apparatus 30, the commodity dictionary data of the corresponding commodity may be transmitted to the clip terminal 50 along with the information regarding the registered commodity. Alternatively, the commodity dictionary data may be stored in advance in the clip terminal 50.

When the registered commodity is stored in the commodity checklist, the processor 50A starts measuring an elapsed time from the storing of the registered commodity in the commodity checklist. The processor 50A determines whether the elapsed time exceeds a preset time before it can be confirmed that the commodity corresponding to the registered commodity has been inserted in the cart 60 (Act46).

The commodity planned to be purchased by the customer is handled in a series of operations including selecting a commodity from a commodity shelf or the like, scanning the commodity using the electronic apparatus 30, and subsequently loading the commodity in the cart 60. Accordingly, when a preset time elapses from the scanning of the commodity, there is a possibility that the customer has forgotten to insert the registered commodity in the cart 60. Therefore, the customer is notified. When it is determined that the elapsed time exceeds the preset time for the registered commodity (Yes in Act46), the processor 50A transmits a request for inserting the commodity into the cart 60, to the electronic apparatus 30 (Act47).

When the request for inserting the commodity is received from the clip terminal 50 (Yes in Act18), the processor 30A of the electronic apparatus 30 displays a commodity insertion request message prompting the customer to insert the commodity in the cart 60 along with the information (the commodity name, the commodity image, the price, and the like) regarding the registered commodity on the touch panel 30D (Act19). For example, a message "PLEASE INSERT REGISTERED COMMODITY IN CART." is displayed, as illustrated in FIG. 9A. The commodity insertion request message may be displayed on the electronic apparatus 30 and may also be displayed on the touch panel 50D of the clip terminal 50. When there are a plurality of commodities which are targets of the commodity insertion request message, for example, information regarding the plurality of target commodities may be listed to be displayed so that the customer can reliably recognize the target commodities.

When it is detected that the customer performs an operation of inserting or taking out the commodities through image processing performed on an image captured by the camera 50E, the processor 50A of the clip terminal 50 detects that the commodities are inserted or taken out based on a change of the objects in the cart before and after the operation is detected. The processor 50A can detect the operation of inserting or taking out the commodities not only based on the image but can also determine whether the commodities are inserted or taken out by making comparison with a change in a weight detected by the gravimetric sensor 601 at a timing at which the operation is detected.

Figure 10:
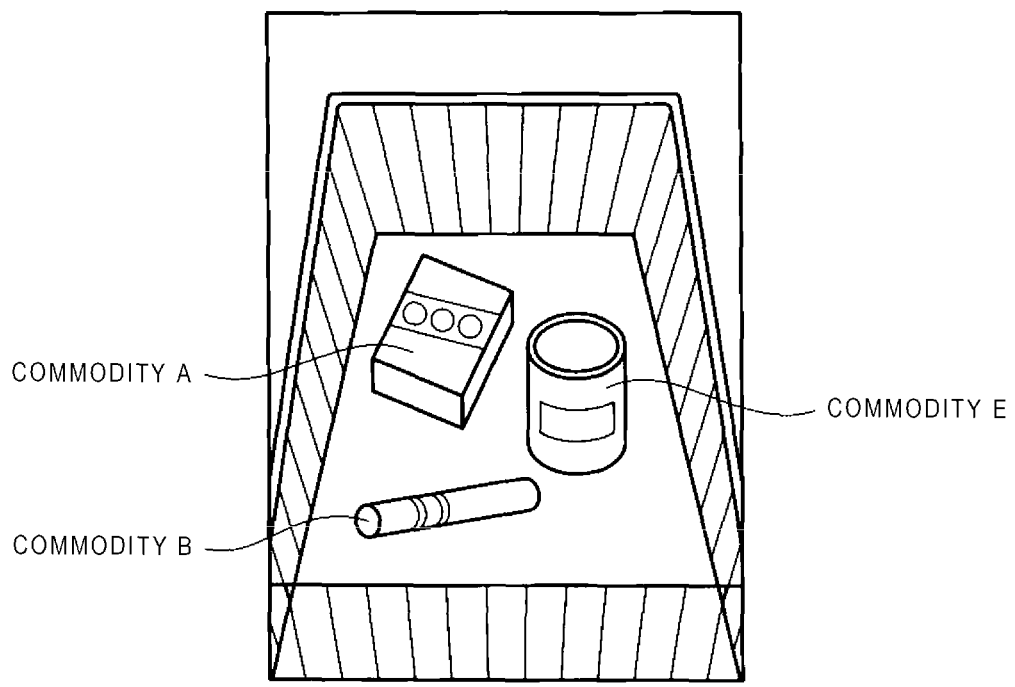
FIG. 10 is a diagram illustrating an example of an image captured by a camera according to the embodiment.

FIG. 10 illustrates an example of an image captured by the camera 50E according to the embodiment. In the example illustrated in FIG. 10, for example, a state in which three commodities A, B, and E are inserted in the cart 60 is illustrated.

The processor 50A detects the position of the upper frame 60B of the cart 60 and the region of the basket bottom 60C from an image captured by the camera 50E. Since the clip terminal 50 is fixed to the cart 60, the regions of the upper frame 60B and the basket bottom 60C in the image are basically fixed during the shopping. The processor 50A determines that the customer performs the operation of inserting or taking out the commodities, for example, when an object moved to the inside of the cart is detected from the outside the cart using the position of the upper frame 60B as a reference.

The processor 50A detects objects corresponding to the commodities from an image captured by the camera 50E through known image processing and stores the positions of the objects as object management data.

Figure 11:
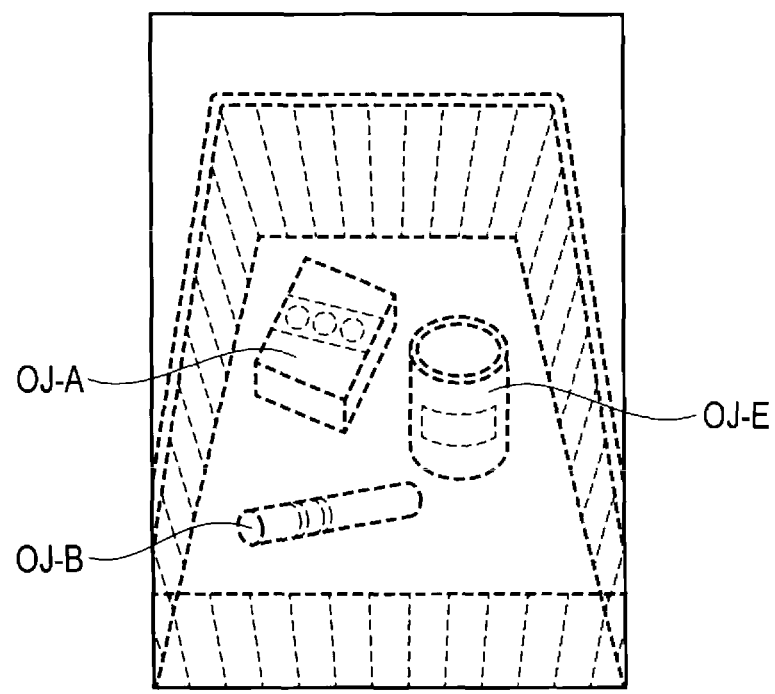
FIG. 11 is a diagram illustrating examples of objects corresponding to commodities detected from the image illustrated in FIG. 10.

FIG. 11 is a diagram illustrating examples of objects OJ-A, OJ-B, and OJ-E corresponding to commodities detected from the image illustrated in FIG. 10. The processor 50A detects that the commodities are inserted or taken out based on a change of the objects in the cart before and after the customer inserts or takes out the commodities.

When an object corresponding to a commodity is detected from the image (Yes in Act48), the processor 50A refers to the commodity checklist to determine whether a registered commodity of the check result "NG" is stored. That is, the processor 50A determines whether there is a commodity for which it is not confirmed that the corresponding commodity is inserted in the cart 60 although the commodity has been registered by the electronic apparatus 30. Here, when the registered commodity of the check result "NG" is stored (Yes in Act49), the processor 50A performs recognizing an object detected from the image using the commodity dictionary data corresponding to the registered commodity of the check result "NG" (Act52).

Here, based on a processing result of the object recognition performed using the commodity dictionary data, it is determined whether the object detected from the image is the registered commodity corresponding to the commodity dictionary data. For example, when a feature of the image in which the object is shown and a feature indicated by the commodity dictionary data indicate similarity exceeding a preset reference value, it is determined that the object is the registered commodity corresponding to the commodity dictionary data.

Here, when it is determined that the object is the registered commodity (Yes in Act53), the processor 50A stores the object detected from the image as the detected object in association with the registered commodity which corresponds to the commodity dictionary data used in the object recognition and is previously stored in the commodity checklist (Act54). Data or the like indicating similarity (the degree of similarity) in the object recognition may be stored as data related to the detected object. Thus, when it is determined that the object is the registered commodity corresponding to the commodity dictionary data, but the degree of similarity is low, an attendant can prompt the customer to confirm the commodity before payment.

The processor 50A sets the check result "OK" corresponding to a pair of the registered commodity and the detected object (Act55) and stores a state in which it is confirmed that the registered commodity is inserted in the cart 60. In this case, the processor 50A transmits commodity insertion confirmation to the electronic apparatus 30 (Act56).

When the commodity insertion confirmation is received from the clip terminal 50 (Yes in Act20) and a commodity insertion request message is displayed, the electronic apparatus 30 erases the message from the touch panel 30D (Act28). Thus, the customer can be notified that the clip terminal 50 confirms that the registered commodity is inserted in the cart 60.

When there are a plurality of registration commodities of the check result "NG" in the commodity checklist, the processor 50A performs object recognition using the commodity dictionary data of the registered commodities. For an object which is not determined to be the registered commodity through the object recognition (No in Act53), the processor 50A stores the object of the check result "NG" as a detected object unregistered as the commodity in the commodity checklist (Act50). When the object is detected from the image (Yes in Act48) and the registered commodity of the check result "NG" has not been set (No in Act49), the processor 50A similarly stores the object of the check result "NG" as an unregistered commodity in the commodity checklist (Act50).

The data D3 illustrated in FIG. 8 indicates that the commodity C is registered in the electronic apparatus 30, but the check result "NG" is set and it is not confirmed that the commodity can be inserted in the cart 60. The data D4 indicates that non-registration commodities E and F are previously inserted in the cart 60 and are thus detected as objects E and F (the check result "NG").

When the detected object (the check result "NG") as an unregistered commodity is stored in the commodity checklist (Act50), the processor 50A transmits a commodity registration request to the electronic apparatus 30 (Act51). The processor 30A of the electronic apparatus 30 receives the commodity registration request from the clip terminal 50 (Yes in Act21) and displays a commodity registration request message prompting the customer to register the commodity on the touch panel 30D. For example, the commodity registration request message "UNREGISTERED COMMODITY IS IN CART. PLEASE REGISTER COMMODITY." is displayed, as illustrated in FIG. 9B. The commodity registration request message may be displayed on the electronic apparatus 30 and may also be displayed on the touch panel 50D of the clip terminal 50 (Act22).

The commodity registration request message displayed on the touch panel 50D is erased (Acts 20 and 28) when the commodity is registered, as described above, and it is subsequently confirmed that the commodity is inserted in the cart 60 through the object recognition performed using the commodity dictionary data of the registered commodity (Acts 49 to 51).

Conversely, when the commodity registered as the commodity planned to be purchased is returned, the customer scans the barcode attached to the commodity which is a return target using the camera 30E of the electronic apparatus 30 (Act12). The processor 30A detects the barcode from the image captured by the camera 30E and extracts the commodity code from the barcode. The processor 30A displays the information (the commodity name, the price, the commodity image, and the like) regarding the commodity corresponding to the commodity code on the touch panel 30D and allows the customer to confirm the commodity which is the return target. Here, when the customer performs an operation of instructing commodity cancellation (for example, touches a button of the commodity cancellation displayed on the touch panel 30D) (No in Act13), the processor 30A deletes the commodity read through the commodity scanning from the commodities planned to be purchased (Act16). The processor 30A transmits notification of the registration cancellation to the clip terminal 50 along with information regarding the commodity which is a cancellation (return) target (Act17).

When the notification of the registration cancellation is received from the electronic apparatus 30 (Yes in Act60), the clip terminal 50 determines the corresponding registered commodity from the commodity checklist based on the information regarding the cancellation target commodity (Act61) and deletes the information regarding the registered commodity (Act62). The processor 50A transmits notification of cancellation completion to the electronic apparatus 30 (Act63). When the notification of the cancellation completion is received (Yes in Act25) and the commodity insertion request message is displayed, the electronic apparatus 30 erases the commodity insertion request message (Act28). As already set forth above, when the commodity is registered through the commodity registration and a setting time subsequently elapses without inserting a commodity in the cart 60, the electronic apparatus 30 displays the commodity insertion request message. When the customer performs a commodity cancellation operation on the commodity registered through the commodity registration, the electronic apparatus 30 erases the commodity insertion request message for the corresponding commodity.

When the customer takes out the commodity inserted in the cart 60, the processor 50A of the clip terminal 50 determines that the customer determines an operation of inserting or taking out the commodity based on an image captured by the camera 50E and detects the object corresponding to the commodity taken out through known image processing. As in the case in which the object is detected when the commodity is inserted, a change in a weight is detected by the gravimetric sensor 601 to determine that the commodity is taken out.

When it is detected that the object (the commodity) is taken out from the cart 60 (Yes in Act64), the processor 50A determines whether the registered commodity corresponding the detected object is stored in the commodity checklist (the check result "OK"). Here, when the corresponding registered commodity is not stored (No in Act65), the processor 50A deletes the detection object corresponding to the commodity which is taken out from the commodity checklist (Act68).

Conversely, when the corresponding registered commodity is stored (Yes in Act65), the processor 50A transmits a commodity cancellation request to the electronic apparatus 30 (Act66). The processor 50A sets the check result "NG" in the detection object corresponding to the commodity which is taken out (Act67).

When the commodity cancellation request is received from the clip terminal 50 (Yes in Act23), the processor 30A of the electronic apparatus 30 displays a commodity cancellation request message prompting the customer to perform an operation of cancelling the commodity on the touch panel 30D (Act24). For example, as illustrated in FIG. 9C, the commodity cancellation request message "COMMODITY HAS BEEN TAKEN OUT FROM CART. PLEASE PERFORM RETURN OPERATION WHEN COMMODITY IS RETURNED." is displayed, as illustrated in FIG. 9C. The commodity cancellation request message may be displayed on the electronic apparatus 30 and may also be displayed on the touch panel 50D of the clip terminal 50.

When the commodity is taken out from the cart 60, the data stored in the commodity checklist is immediately updated. Alternatively, after a preset time (for example, 10 seconds) has elapsed since the commodity is taken out from the cart 60, the data stored in the commodity checklist may be updated as data for which there is a high possibility of the commodity being cancelled (returned). In other words, the commodity cancellation request message may be immediately displayed on the electronic apparatus 30 in response to extraction of the commodity or may be displayed after the set time is elapsed.

In this way, when the customer mounts the clip terminal 50 on the cart 60 and performs shopping while performing the commodity registration using the electronic apparatus 30, the customer can easily confirm the message displayed on the electronic apparatus 30 although the customer forgets to register the commodity planned to be purchased and forgets to insert the commodity in the cart 60.

When the registration of the commodity planned to be purchased is completed, for example, the customer operates a subtotal button to given an instruction to end the commodity registration. When the instruction to end the commodity registration is given by the customer (Yes in Act26), the processor 30A of the electronic apparatus 30 displays a confirmation screen of the registered commodities and allows the customer to designate a payment method (e.g., credit, cash, direct debit, electronic money, or the like). The processor 30A generates payment information based on information relating to the commodities registered through the commodity registration.

The processor 30A of the electronic apparatus 30 transmits the notification of end of the registration to the clip terminal 50 (Act27). When the notification of the end of the registration is received from the electronic apparatus 30 (Yes in Act69), the processor 50A of the clip terminal 50 transmits data of the commodity checklist to the electronic apparatus 30 (Act70). The data also includes, for example, data indicating the degree of similarity at the time of recognizing the detected objects. The processor 5 OA transmits the data of the commodity checklist, and subsequently clears the data of the commodity checklist to end the process (Act71).

When an instruction to end the registration is given and the data of the check result "NG" remains in the data stored in the commodity checklist, a message prompting the customer to confirm the data, is displayed again on the touch panel 30D of the electronic apparatus 30 (and optionally, also on the touch panel 50D of the clip terminal 50).

When a final confirmation is given from the customer, the processor 30A of the electronic apparatus 30 displays a code (a barcode or a 2-dimensional code) that includes payment information and data prompting the attendant to confirm the final confirmation.

The attendant scans the code displayed on the touch panel 30D of the electronic apparatus 30 using the camera of the electronic apparatus 40. The electronic apparatus 40 displays the payment information included in the code and a confirmation screen including the data which is necessary to be confirmed. For example, a list (including commodity names, prices, subtotal amount, and the like) of the commodities planned to be purchased and registered through the registration by the customer and reward points are displayed on the electronic apparatus 40. Thus, the attendant can confirm whether the commodities inserted in the cart 60 are identical to the registered commodities. Further, the electronic apparatus 40 displays, for example, the commodities corresponding to the detected objects of which the degree of similarity is low in the object recognition carried out by the clip terminal 50, based on the data which is necessary to be confirmed. Thus, the attendant can easily recognize the commodities which is particularly necessary to be confirmed, and thus it is possible to reduce a burden on the confirmation work.

As described above, for example, the image processing in the clip terminal 50 is used to check whether the registration commodities are identical to the commodities inserted in the cart 60. However, the weights of the commodities detected by the gravimetric sensor 601 may be used to check the commodities. For example, since data of the weights of the commodities is included in data regarding the commodities provided from the store server 20A, the checking can be performed based on whether the weight increase at the time of inserting a commodity in the cart 60 is identical to the weight of the registered commodity within an acceptable error range. In particular, using data of weights detected by the gravimetric sensor 601 is effective in checking sell-by-weight type commodities. For example, it is possible to confirm a dishonest action of inserting a commodity heavier than the same kind of registered commodity in the cart 60 after a commodity having a less weight is registered through the registration. When there is a sell-by-weight type commodity in the commodity checklist and a difference between the weight of a registered commodity and a weight at the time of insertion in the cart 60 is greater than a set value, data indicating that confirmation is necessary is stored. Thus, as described above, the attendant can easily recognize that the confirmation is particularly necessary.

Further, as described above, it is checked whether the commodities registered in the registration are identical to the commodities inserted in the cart 60. However, the clip terminal 50 can also be used to check the registered location of commodities. For example, when a difference between a location of a target commodity in a store at a timing of commodity registration in the electronic apparatus 30 (or a timing of detecting a commodity by the clip terminal 50) and a position of a commodity shelf on which the target commodity is located in the store is greater than a predetermined distance, it can also be determined that confirmation is necessary.

Figure 12:
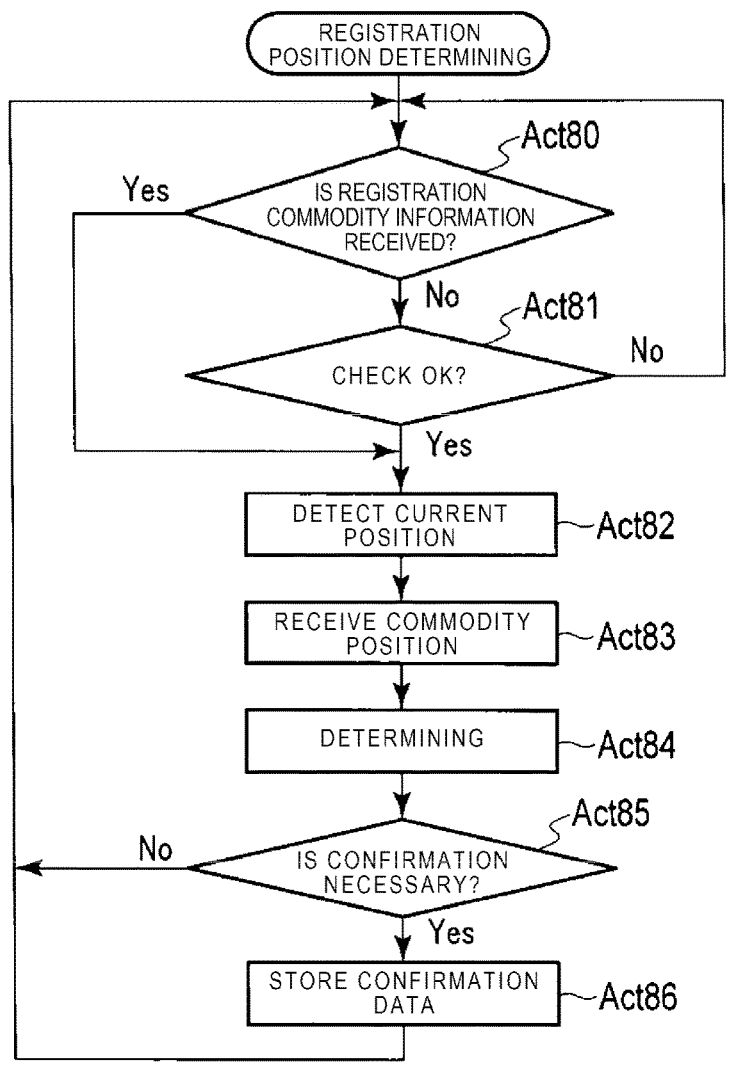
FIG. 12 is a flowchart illustrating registration location determination performed to determine whether confirmation is necessary, according to the embodiment.

FIG. 12 is a flowchart illustrating registration location determination performed to determine whether confirmation is necessary, according to the embodiment. The processor 50A of the clip terminal 50 performs the registration location determination based on the check program. The registration location determination is performed in parallel with the above-described presence checking.

When commodity information regarding a commodity that has been registered, is received from the electronic apparatus 30 (Yes in Act80) or when it is confirmed that the registered commodity corresponds to the detected object (the check result "OK") (Yes in Act81), the processor 50A detects a current position of the commodity (Act82). The current position can be detected, for example, by communicating with an RF tag attached to each of commodity shelves in the store by the reader-writer 50J.

Figure 13:
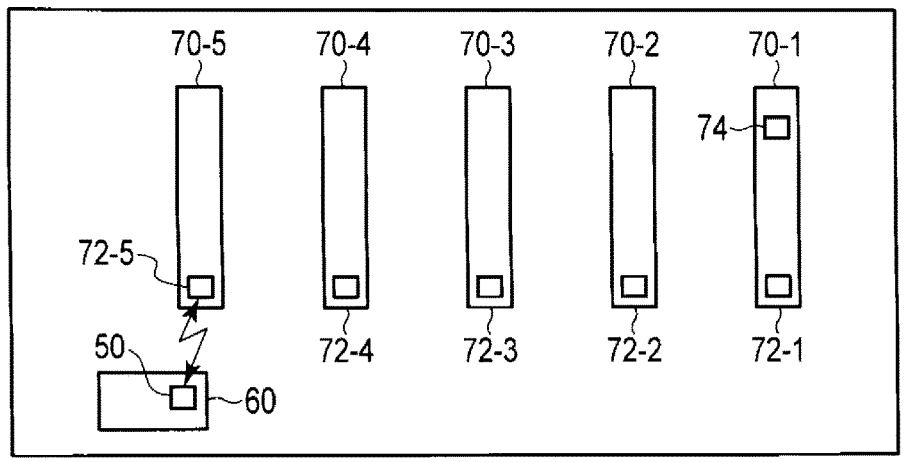
FIG. 13 is a diagram illustrating an example of layout of commodity shelves and a position of a cart in a store.

FIG. 13 illustrates an example of layout of commodity shelves 70-1 to 70-5 and a position of the cart 60 in the store. The clip terminal 50 mounted on the cart 60 can determine that the cart 60 is near the commodity shelf 70-5 when it is possible to communicate with an RF tag 72-5 mounted on the commodity shelf 70-5 through communication within a restricted range by the reader-writer 50J. The current position of the clip terminal 50 (and thus indirectly the position of the cart 60) can be detected using not only the method of using the reader-writer 50J (the RF tag) but also a method such as a difference in a radio wave intensity between the communication module 50F and the plurality of access points 20F or image processing performed on an image obtained by imaging the inside of the store to detect the position of the cart 60 within the store.

When the current position is detected, the processor 50A acquires data indicating the commodity position of a registered commodity that is later sold through, for example, the store server 20A or the electronic apparatus 30 (Act83). The processor 50A determines whether a difference between the current position and the commodity position (the position of the commodity shelf) is greater than a predetermined distance (Act84). When a commodity 74 disposed on the commodity shelf 70-1 illustrated in FIG. 13 is registered or is inserted in the cart 60 at a position close to the commodity shelf 70-5, it is determined that confirmation is necessary since the customer performs an operation different from a normal operation (Yes in Act85). The clip terminal 50 stores confirmation data in association with data corresponding to the detected object and the corresponding registered commodity to the commodity checklist. Thus, as described above, the attendant can easily recognize that the confirmation is particularly necessary.

According to at least one of the above-described embodiment, the clip terminal 50 is used to check whether the commodity information registered through the registration by the electronic apparatus 30 is identical to the commodities corresponding to the detected objects corresponding to the commodities inserted in or taken out from the cart 60 and detected by the clip terminal 50. According to the check result, a message prompting the customer to confirm the data can be displayed. Therefore, it is possible to reliably register the commodities planned to be purchased through a customer operation.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

The processes described in the above-described embodiments can be implemented as a program executed by a computer on a recording medium such as a magnetic disk (a flexible disc, a hard disk, or the like), an optical disc (a CD-ROM, a DVD, or the like), or a semiconductor memory to be provided to various apparatuses. The program may be transmitted through a communication medium to be provided to various apparatuses. A computer reads the program recorded on a recording medium or receives the program via a communication medium and an operation is controlled by the program to perform the above-described processes.

What is claimed is:

1. A computing device installed in or mountable to a shopping cart, comprising:
   a camera configured to capture an image; and
   a processor configured to:
      acquire commodity data of a commodity that has been registered as a registered commodity to be purchased by a customer,
      when an object is placed in the shopping cart, perform object recognition on an image of the object captured by the camera, and determine whether the recognized object is a commodity corresponding to the acquired commodity data,
      upon determining that the recognized object is not the commodity corresponding to the acquired commodity data, issue a request for displaying a message instructing the customer to register the recognized object as a registered commodity, and
      after the message is displayed,
         when another object is placed in the shopping cart, perform object recognition on an image of the other object captured by the camera, and determine whether the recognized object is the registered commodity, and
         upon determining that the recognized object is the registered commodity, issue a request for cancelling the display of the message.

2. The computing device according to claim 1, further comprising:
   a display, wherein the message is displayed on the display.

3. The computing device according to claim 1, further comprising:
   a network interface, wherein the request is transmitted to another device via the network interface.

4. The computing device according to claim 1, further comprising:
   a network interface, wherein the commodity data is received from another device via the network interface.

5. The computing device according to claim 4, wherein said another device is a wireless terminal configured to display information about registered commodities.

6. The computing device according to claim 1, further comprising:
   an interface connectable to a sensor configured to weigh objects in the shopping cart, wherein
   the processor is configured to perform the object recognition upon detection of changes in weight of the objects in the shopping cart by the sensor.

7. The computing device according to claim 1, wherein an imaging area of the camera includes an entire perimeter of the shopping cart.

8. The computing device according to claim 1, further comprising:
   a wireless tag reader having a communication range to detect a wireless tag attached to an object placed in the shopping cart.

9. The computing device according to claim 1, further comprising:
   a wireless tag reader having a communication range to detect a wireless tag attached to an object displayed on a commodity shelf.

10. The computing device according to claim 1, wherein the computing device is mounted on a handle of the shopping cart.

11. A method performed by a computing device installed in or mountable to a shopping cart, the method comprising:
    acquiring commodity data of a commodity that has been registered as a registered commodity to be purchased by a customer;
    when an object is placed in the shopping cart, capturing an image of the object with a camera, performing object recognition on the image, and determining whether the recognized object is a commodity corresponding to the acquired commodity data;
    upon determining that the recognized object is not the commodity corresponding to the acquired commodity data, issuing a request for displaying a message instructing the customer to register the recognized object as a registered commodity, the message including a name of the recognized object; and
    after the message is displayed,
       when another object is placed in the shopping cart, performing object recognition on an image of the other object captured by the camera, and determining whether the recognized object is the registered commodity, and
       upon determining that the recognized object is the registered commodity, issuing a request for cancelling the display of the message.

12. The method according to claim 11, further comprising:
    displaying the message on a display.

13. The method according to claim 11, further comprising:
    transmitting the request to another device via a network interface.

14. The method according to claim 11, further comprising:
    receiving the commodity data from another device via a network interface.

15. The method according to claim 14, wherein said another device is a wireless terminal configured to display information about registered commodities.

16. The method according to claim 11, wherein the object recognition is performed upon detection of changes in weight of objects in the shopping cart by a sensor.

17. The method according to claim 11, wherein an imaging area of the camera includes an entire perimeter of the shopping cart.

18. The method according to claim 11, further comprising:
    detecting a wireless tag attached to the object placed in the shopping cart by a wireless tag reader.

19. The method according to claim 11, further comprising:

detecting a wireless tag attached to an object displayed on a commodity shelf by a wireless tag reader.

20. The method according to claim 19, wherein a location of the shopping cart can be determined based on information acquired from the detected wireless tag.

21. A computing device installed in or mountable to a shopping cart, comprising:

a camera configured to capture an image; and a processor configured to:

acquire commodity data of a commodity that has been registered as a registered commodity to be purchased by a customer, when an object is placed in the shopping cart, perform object recognition on an image of the object captured by the camera, and determine whether the recognized object is a commodity corresponding to the acquired commodity data, and upon determining that the recognized object is not the commodity corresponding to the acquired commodity data, issue a request for displaying a message instructing the customer to register the recognized object as a registered commodity, wherein the processor is further configured to:

when an object is removed from the shopping cart, perform object recognition on an image of the object captured by the camera, and determine whether the recognized object is a registered commodity, and upon determining that the recognized object is a registered commodity, issue a request for displaying a message instructing the customer to unregister the registered commodity.

* * * * *